May 29, 1923.

B. P. DONNELLY

CURTAIN LIGHT MOUNTING

Filed Nov. 29, 1922

1,456,724

Inventor
Bernard P. Donnelly

By Frank E. Liverance, Jr.
Attorney

Patented May 29, 1923.

1,456,724

UNITED STATES PATENT OFFICE.

BERNARD P. DONNELLY, OF HOLLAND, MICHIGAN.

CURTAIN-LIGHT MOUNTING.

Application filed November 29, 1922. Serial No. 604,014.

*To all whom it may concern:*

Be it known that I, BERNARD P. DONNELLY, a citizen of the United States, residing at Holland, in the county of Ottawa and State of Michigan, have invented certain new and useful Improvements in Curtain-Light Mountings; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention relates to a construction of glass mounting for lights in curtains, used particularly for curtains in motor vehicles and is an improvement over the construction shown in my Patent No. 1,440,344, issued December 26, 1922.

It is an object and purpose of the present invention to provide a mounting which may be molded as a single unit from rubber and which may be installed in a suitable opening cut in the curtain, the curtain being sewed to the mounting in a very expeditious manner.

A further object of the invention is to provide this mounting with a novel type of reinforcement together with a novel manner of mounting the glass therein whereby the glass is cushioned against vibration and at the same time a practically waterproof joint is made between said mounting and the glass.

All of these objects and purposes together with others not at this time specifically stated will appear as understanding of the invention is had from the following description taken in connection with the accompanying drawing, in which.

The curtain indicated at 1 is of any suitable material commonly used for this purpose and in the same an opening is made for the glass 2, which opening is somewhat larger than the glass. The glass is designed to be mounted in and held by a frame indicated as a whole at 3 and which is made of rubber molded in a single piece, the frame being of a size to pass around the glass as will later appear. From the outer edges of the frame and entirely around the same two flanges 4 project outwardly between which the adjacent portions of the curtain 1 at the opening therein pass and the frame and flanges are connected together by sewing through both flanges and the curtain.

Figure 1:
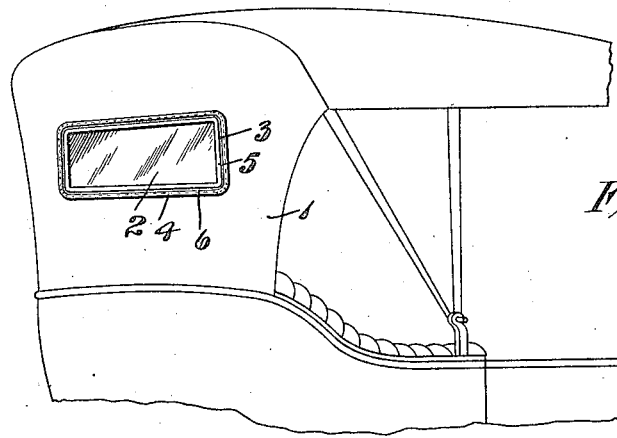
Figure 1 is a fragmentary perspective view of a motor vehicle top showing the back curtain equipped with the invention.
Figure 2:
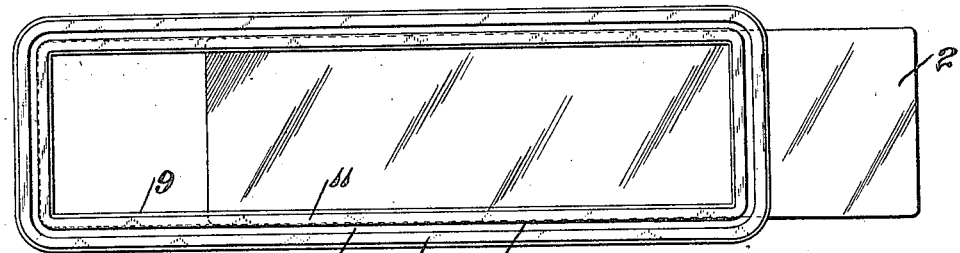
Figure 2 is an enlarged elevation of the frame or mounting for the glass and illustrating the glass partly inserted therein.
Figure 3:
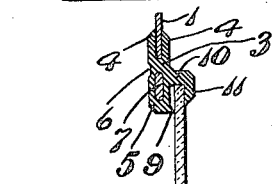
Figure 3 is an enlarged vertical section through the frame and glass at a point between the ends of the frame.
Figure 4:
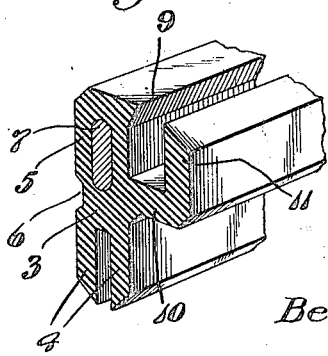
Figure 4 is a fragmentary enlarged transverse section and partial perspective, the section being taken through one side of the frame mounting.
Figure 5:
Figure 5 is a fragmentary vertical section taken through the frame in the plane of the reinforcing member.

In alignment with the flanges and extending inwardly is a relatively heavy flange 5. The frame is grooved at its outer side at 6 entirely around the same, thereby making a reduced section between the outer flanges 4 and the inner flange 5 described. A bar 7 of metal, formed to correspond with the frame, is embedded in the flange 5 at the time of molding the frame mounting. The bar is relatively wide in comparison with its thickness and is positioned so that it lies in the same plane with the curtain 1 in the direction of its width. It will be noted that the reduced section provided by forming the groove 6 is located between the reinforcing bar and the curtain. In practice the reinforcing bar is formed from a single piece of flat stock and where the ends meet any suitable type of connecting joint, such as indicated at 8 in Figure 5, may be used to secure them together. Of course, any other equivalent type of permanent connection may be used in its stead. The flange 5 at its inner edge and on its inner side is formed with a triangular shaped lip 9 as shown.

Below the lip 9 and integrally formed with the frame mounting 3 is an inwardly projecting ledge 10 which is turned upwardly in substantial parallelism with the flange 5, making a second flange 11. The flanges 5 and 11 are continuous throughout the entire length of the frame and between them a groove is provided for the reception of the glass 2. One end of the frame mounting is slit vertically between flanges 4 as fully described in my Patent No. 1,440,344 and the glass is inserted through the slit into the grooves between the flanges 5 and 11. In this shape, with the glass held in the frame mounting, the construction may be shipped from the factory to the user or the manufacturer and the curtain is sewed in place at the time of installation of the window in the motor vehicle top.

It will be noted that the outer sides of the flange 5 and of the outer flange 4 lie in the same plane so that, when the curtain is sewed in place, these sides of the flanges 5 and 4 may lie flat on the sewing machine table and the foot of the sewing machine may follow around the outer side of the inner flange 4 around the projecting ledge 10. The installation of this frame mount in a curtain is extremely rapid and inexpensive. The inner flange 11 has a tendency to press the glass against the tip of the lip 9 which compresses under such pressure and bears tightly against the glass, a cushioning effect being produced and at the same time a joint made such that water cannot pass between the lip and the surface of the glass. The reinforcing bar 7 is positioned so that any strain coming from shrinkage of the curtain or otherwise is transmitted to the bar in the direction of its width and, as the bar is relatively wide, a very firm resistance is made against any outward movement of the sides of the frame away from the glass. At the same time the reduced section of the frame between the reinforcing member and the curtain 1 is directly subjected to such strain and will yield and stretch sufficiently to relieve the strain before the bar is drawn outwardly any distance.

This construction shown and described for a glass mounting for use with curtains in motor vehicles is simple, inexpensive to make and is exceptionally easy to install. The glass placed in the frame at the factory is protected against breakage in shipment and handling and, when the curtain is attached to the frame, it is obvious that the slitted end through which the glass passes into the frame is closed by the sewing of the curtain to the flanges 4. The ability to yield or stretch at a point between the curtain and the reinforcing bar is very practical and useful, while the cushioning joint made by the lip 9 on flange 5 against the glass is particularly practical and effective. It is also obvious that this flange being rigidly reinforced by the flat bar 7 resists any tendency to bend outwardly against the pressure of the glass on the lip 9.

The appended claims define the invention and it is considered that all modifications coming within their scope are comprehended by the invention.

What I claim is:

1. In a construction of the class described, a section of glass, means in which the glass is mounted comprising an endless frame of rubber molded as a single unit and including a relatively thick inwardly projecting continuous flange, a pair of spaced apart outwardly projecting flanges in alignment with the first flange between which pair of flanges a vehicle curtain is adapted to pass and be secured, a reinforcing frame embedded in and molded with the first flange, said frame being formed of a relatively wide flat bar of metal and lying in the same plane with the curtain when attached to said pair of flanges, a ledge projecting laterally from the frame between the first flange and the pair of flanges, a fourth flange turned from said ledge to lie in substantial parallelism with the first flange and spaced therefrom to make a continuous groove in the frame in which the edge portions of the glass are seated, and a triangular shaped lip projecting from the inner edge of the first flange toward the fourth flange to bear against the glass and cushion the same and make a tight joint between the glass and the first flange.

2. A construction containing the elements in combination defined in claim 1, said frame having a continuous groove formed in a side thereof between the first flange and the pair of flanges thereby providing a section of reduced thickness between the first flange and pair of flanges and between the reinforcing frame and the curtain when it is attached to said pair of flanges.

3. In a construction of the class described, means in which glass may be mounted comprising an endless frame of rubber molded as a single unit and including a relatively thick inwardly projecting flange, a pair of spaced apart outwardly projecting flanges in alignment with the first flange, a reinforcing frame of flat bar metal embedded in and molded with the first flange, and a laterally extending ledge formed with the frame between the first flange and the pair of flanges and at its outer edges being turned and continued in a fourth flange substantially paralleling the first flange, there being a continuous groove between said first and fourth flanges in which the edge portions of a section of glass are adapted to seat.

4. In a construction of the class described, an open frame of rubber or like material formed as a single unit and including an outwardly extending continuous flange, a pair of inwardly extending continuous flanges positioned in alignment with the first flange, one side of the first flange and one side of the pair of flanges lying in the same plane, a laterally extending continuous ledge projecting from the frame between the first flange and the pair of flanges, a fourth flange turned from the outer edge portions of said ledge to lie substantially parallel to the first flange, and means to reinforce the frame against distortion.

5. In a construction of the class described, an open frame of rubber or like material including a continuous flange, a reinforcing frame of flat bar metal embedded in said flange, said bar being positioned in the flange so that its width parallels the sides of the flange, means extending inwardly from said flange in alignment therewith to which a curtain is adapted to be attached, and a glass retaining means formed integrally with the frame and extending to one side thereof including a second continuous flange substantially paralleling the first flange and spaced therefrom, whereby a continuous groove is formed between the flanges in which the edge portions of a section of glass are adapted to be received and held.

6. In a construction of the class described, an open frame of rubber or like material including a continuous flange, means extending inwardly from said flange in alignment therewith to which a curtain is adapted to be attached, glass retaining means formed integrally with the frame and extending to one side thereof including a second continuous flange substantially paralleling the first flange and spaced therefrom, whereby a continuous groove is formed between the flanges in which the edge portions of a section of glass are adapted to be received and held, said first flange at its inner edge and at the side adjacent the second flange having an integral continuous lip formed thereon extending into the groove between said flanges, said lip being widest where it joins the body of the flange and decreasing in width outwardly.

In testimony whereof, I hereunto affix my signature.

BERNARD P. DONNELLY.